United States Patent [19]
Koenck et al.

[11] Patent Number: 5,714,812
[45] Date of Patent: Feb. 3, 1998

[54] COMBINED ENERGY AND DATA STORAGE SYSTEM

[75] Inventors: Steven E. Koenck, Cedar Rapids; William Henry Keehn, II, Marion, both of Iowa

[73] Assignee: Norand Corporation, Cedar Rapids, Iowa

[21] Appl. No.: 422,558

[22] Filed: Apr. 14, 1995

[51] Int. Cl.[6] ........................................ H02K 7/02
[52] U.S. Cl. ........................ 310/74; 310/67 R; 310/68 R
[58] Field of Search ..................... 310/74, 66, 67 R, 310/68 R, 40 MM, 273

[56] References Cited

U.S. PATENT DOCUMENTS

| | | | |
|---|---|---|---|
| 4,072,874 | 2/1978 | Arnold, Jr. | 310/268 |
| 5,124,605 | 6/1992 | Bitterly et al. | 310/74 |
| 5,268,608 | 12/1993 | Bitterly et al. | 310/90 |
| 5,379,439 | 1/1995 | Harrison et al. | 395/800 |
| 5,506,458 | 4/1996 | Pace et al. | 310/67 R |

OTHER PUBLICATIONS

Hively, Will, Reinventing the Wheel, Discover, pp. 58–68, Aug. 1996.

Primary Examiner—Thomas M. Dougherty
Assistant Examiner—Jonathon D. Link
Attorney, Agent, or Firm—Suiter & Associates PC

[57] ABSTRACT

A data terminal utilizes a rotating flywheel system for energy storage and storage and retrieval. Energy storage and data storage systems are combined into a single system.

5 Claims, 3 Drawing Sheets

COMBINED ENERGY AND DATA STORAGE SYSTEM

TECHNICAL FIELD

The present invention relates generally to energy and data storage systems and particularly to energy and data storage systems for a portable data terminal.

BACKGROUND ART

Developments in the electronic data storage systems and electrochemical energy storage systems have resulted in remarkable advancements in the size and performance of portable electronic devices. Portable electronic devices are generally battery powered with rechargeable electrochemical cells. While rechargeable battery technology is well known and widely used for powering portable electronic devices including computers and data terminals, a number of historical drawbacks to using battery technology exist. For example, rechargeable batteries must be charged using complex and time consuming operations. As electrochemical devices, battery performance is a function of the application environment most especially ambient temperature, and batteries ultimately wear out. The chemicals and metals used in battery manufacture are often hazardous materials requiring special disposal procedures. The maximum energy storage and retrieval potential seem to have reached technological limits. The state of charge indication of many battery technologies is often difficult to accurately ascertain.

With increasing concern for the environmental impact of chemical based technologies, an alternative to battery power is needed.

An alternative to battery energy storage systems has been developed using a mechanical flywheel to store energy in the form of rotational kinetic energy. Various types of flywheel construction methods may be used for energy storage purposes. Anisotropic flywheels consisting of more than one type of material are preferred for energy storage applications since they have the highest strength to weight ratio. One such anisotropic flywheel configuration is taught by Bitterly & Bitterly, U.S. Pat. No. 5,124,605 assigned to American Flywheel Systems, Inc. describing the use of counter-rotating flywheels packaged within an evacuated housing supported by magnetic bearings. Energy is applied to the flywheels by the use of electromagnetic coils which interact with permanent magnets embedded within the flywheels to cause the flywheels to turn as a motor. Energy is delivered by the flywheels when the permanent magnets moving across the coils induce current as a generator. Counter-rotation of the flywheels provides cancellation of gyroscopic effects that might be undesirable for utilization in small hand held devices.

SUMMARY OF THE INVENTION

Thus, a flywheel energy system may be utilized in portable electronic devices such as computers or data terminals using a specially designed flywheel adapted for a hand held electronic device. Most portable electronic data terminals utilize a form of a rotating flywheel in the hard disk drive for data storage. The hard disk drive storage medium and a flywheel energy storage system may be combined into one unit for combined energy and data storage. The combined energy and data storage system would achieve reduction in valuable space previously occupied by two systems (i.e. the battery and the hard disk drive) and would further reduce energy consumption by not requiring the expenditure of energy that was previously used to rotate the disk drive.

It is therefore an object of the invention to provide a flywheel energy storage system for portable electronic devices which replaces conventional rechargeable battery storage systems.

It is a further object of the invention to provide a combined flywheel energy and data storage system for portable electronic devices which replaces conventional rechargeable battery systems and conventional hard disk drive data storage systems.

DETAILED DESCRIPTION

Figure 1:
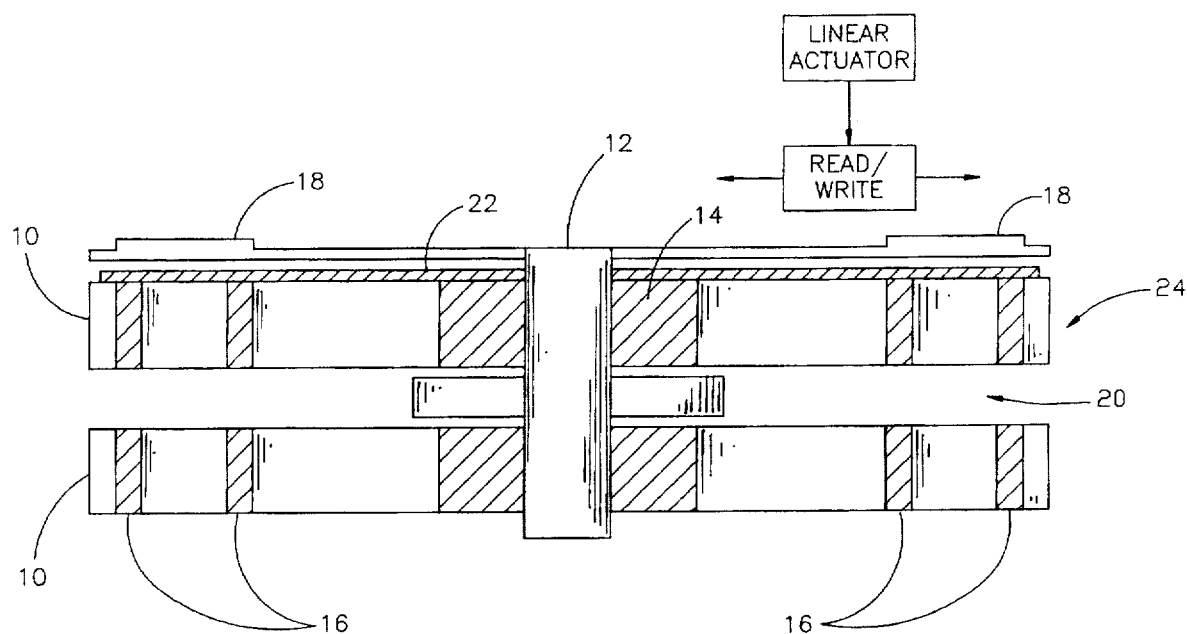
FIG. 1 depicts a side cutaway view of a flywheel energy storage system having a data storage system incorporated therewith

FIG. 1 illustrates a flywheel energy storage system 24 which incorporates a data storage system. Counter rotating anisotropic flywheels 10 are mounted on a shaft 12. Counter rotation is used to offset gyroscopic moments due to rotation of the flywheels 10. Magnetic bearings system 14 minimize the amount of energy lost due to friction. Magnet rotors 16 are disposed radially about the flywheels which operate as rotors when the flywheel system 24 is in motor mode. Electromagnetic coils 18 are used to generate magnetic fields which oppose the magnetic fields of the rotor magnets 16 to drive the flywheels. The flywheels 10 may be enveloped in a vacuum 20 to further reduce frictional losses caused by air.

A storage medium 22 may be disposed on the surface of the flywheels 10. A read and write unit ("READ/WRITE") for reading and writing data from and to storage medium 22 may be controlled by a linear actuator ("LINEAR ACTUATOR") to radially drive the read write unit ("READ/WRITE") along the flywheels 10. The data storage medium 22 may be a magnetic system or may be preferably an optical storage system. The optical data storage system may be an optical-laser system using a CD-ROM type medium having write capabilities.

For purposes of miniaturization such as is typically necessary for use in portable devices, the radius flywheel 10 may be relatively small, on the order of 100 mm to 200 mm for example. In an exemplary embodiment, a flywheel having a radius of 250 mm and a mass of 150 g may be rotated at 500,000 rpm to attain approximately 35 watt-hours of energy storage capacity.

Figure 2:
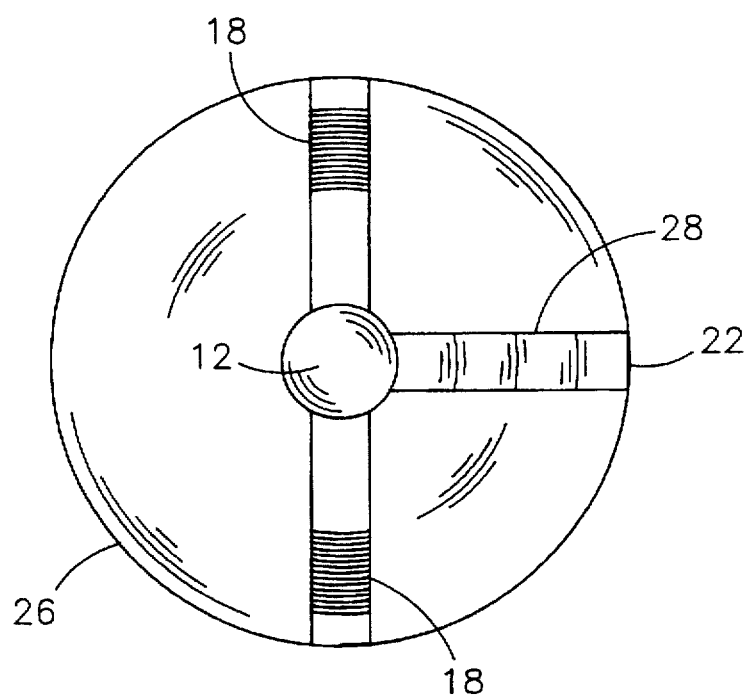
FIG. 2 is an top view of a cover for the flywheel system.

FIG. 2 illustrates a cover for the flywheel storage system from a top view perspective. The cover 26 may be of a generally circular shape covering flywheel 10 of FIG. 1. A radial opening 28 in the cover allows for exposure of the data storage medium 22 disposed on flywheel 10 lying beneath cover 26. The opening 28 permits the read and write unit ("READ/WRITE") shown in FIG. 1 to linearly track along a radial line of flywheel 10. Field coils 18 may be disposed on a different radial line than the radial line of the opening 28. Cover 26 may be fixed to shaft 12.

Figure 3:
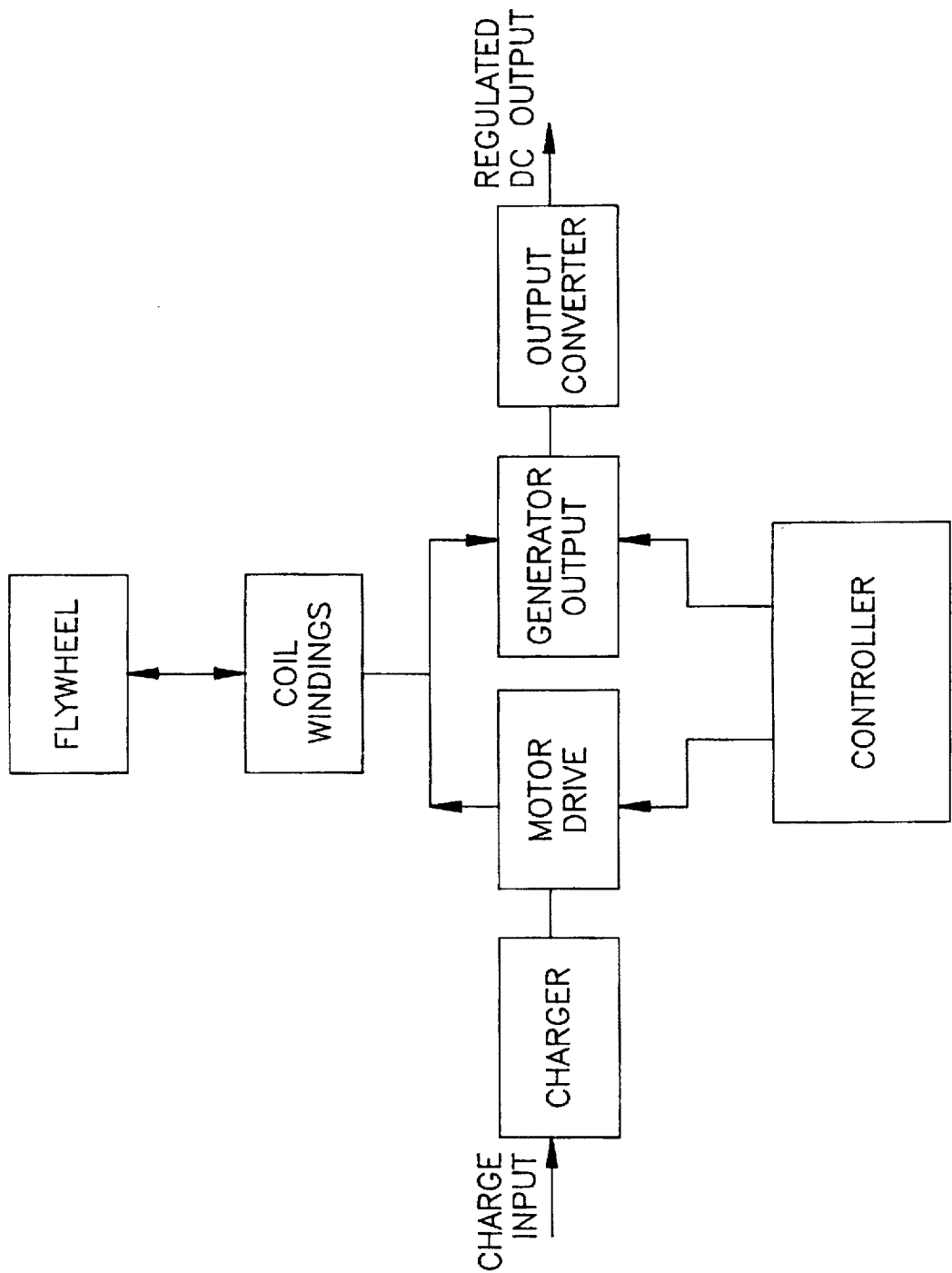
FIG. 3 is a block diagram of a control system for a flywheel energy storage system.

FIG. 3 illustrates the control system of the flywheel system 24. The flywheel ("FLYWHEEL") may act as a motor or a generator to store or supply energy respectively. In motor mode, a charge input ("CHARGE INPUT") may supply the energy for charging the FLYWHEEL by supplying electrical power to a charging unit ("CHARGER"). The CHARGER supplies conditioned power to the motor drive circuitry ("MOTOR DRIVE") which energizes the field coil windings ("COIL WINDINGS"). The coil windings generate a magnetic field which is opposed by the rotor magnets (shown in FIG. 1) of the FLYWHEEL, thereby causing the FLYWHEEL to rotate. Energy is thereby stored in the FLYWHEEL as rotational kinetic energy.

Energy stored in the FLYWHEEL may be retrieved and converted into electrical energy utilized by the portable electronic utilization device (not shown). The magnetic field of the rotor magnets (shown in FIG. 1) of the flywheel induce a current to flow in the COIL WINDINGS which supplies power to the generator output circuitry ("GENERATOR OUTPUT"). The GENERATOR OUTPUT supplies electrical energy to the output convertor circuitry ("OUTPUT CONVERTOR") which produces a regulated DC output ("REGULATED DC OUTPUT") in a form usable by the electronic utilization device (not shown). Control of the motor driving, energy storing function and the generator, energy supplying function may be performed by a microcontroller ("CONTROLLER").

The CONTROLLER is the primary mechanism for monitoring and controlling the flywheels, which may have facilities for synchronizing the rotation of the counter rotating flywheels. Output ports of the CONTROLLER control the electromagnetic field produced by field coils 18 (as shown in FIG. 1). Preferably, the flywheel system 24 (see FIG. 1) utilizes a set of coils 18 to implement a polyphase generator/motor configuration. An exemplary embodiment of the present invention implements a three phase motor/generator configuration. The driving of coil sets 18 of the flywheels 10 may be simplified by driving the two sets of coils in parallel (but reverse polarity for counter rotation) since the rotational velocities of the flywheels 10 need to be as closely matched as possible for cancellation of gyroscopic vector forces.

In view of the above detailed description of a preferred embodiment and modifications thereof, various other modifications will now become apparent to those skilled in the art. The claims below encompass the disclosed embodiments and all the reasonable modifications and variations without departing from the spirit and scope of the invention.

What is claimed is:

1. A combined energy and data storage system for utilization in a portable data terminal comprising:
   (a) a shaft;
   (b) at least one flywheel rotatably mounted on said shaft;
   (c) at least one rotor operatively disposed on said at least one flywheel; (d) a data storage medium operatively disposed on a surface of said at least one flywheel;
   (e) at least one coil operatively disposed in the vicinity of the rotor of said at least one flywheel for employing said at least one flywheel as a generator/motor;
   (f) means for controlling and monitoring said at least one flywheel employed as a generator/motor; and
   (g) means for storing and retrieving data to and from said data storage medium.

2. A combined energy and data storage system as claimed in claim 1, wherein said data storage system is propelled by said at least one flywheel.

3. A combined energy and data storage system, comprising:
   (a) a rotatable flywheel for storing energy as rotational energy;
   (b) an electronic storage medium disposed on said rotatable flywheel for storing electronic data thereon; and
   (c) a control system operatively connected to said rotatable flywheel and to said electronic storage medium, said control system for storing electronic data on and retrieving electronic data from said electronic storage medium, said control system for storing energy in said rotatable flywheel and for retrieving said energy stored in said flywheel and for converting the retrieved energy into electrical energy.

4. A combined energy and energy and data storage system for utilization in a portable data terminal, comprising:
   (a) a shaft;
   (b) at least one flywheel rotatably mounted on said shaft;
   (c) at least one rotor operatively disposed on said at least one flywheel;
   (d) a data storage medium operatively disposed on a surface of said at least one flywheel;
   (e) at least one coil operatively disposed with respect to said at least one rotor for operation of said at least one flywheel as a generator and as a motor;
   (f) a controller for controlling and monitoring the operation of said at least one flywheel;
   (g) a read and write device for storing data to and retrieving data from said data storage medium.

5. A combined energy and data storage system as claimed in claim 4, wherein said data storage system is propelled by said at least one flywheel.

* * * * *